United States Patent [19]

Alexander

[11] Patent Number: 4,474,286

[45] Date of Patent: Oct. 2, 1984

[54] CLOSE-PACK CONVEYOR SYSTEM

[75] Inventor: George R. Alexander, Frankton, Ind.

[73] Assignee: General Motors Corporation, Detroit, Mich.

[21] Appl. No.: 462,527

[22] Filed: Jan. 31, 1983

[51] Int. Cl.³ .................. B65G 17/38; B65G 17/00
[52] U.S. Cl. .................................... 198/802; 104/25;
198/648; 198/792
[58] Field of Search ............ 198/802, 792, 472, 648,
198/580; 104/25, 172 B, 172 R

[56] References Cited

U.S. PATENT DOCUMENTS 2,866,537 12/1958 Immesberger .
3,319,038 5/1967 Meister et al. .
3,348,661 10/1967 Brautovich .
3,976,191 8/1976 Santic .

Primary Examiner—Jeffrey V. Nase
Attorney, Agent, or Firm—Edward J. Biskup

[57] ABSTRACT

A conveyor system that moves closely spaced carrier members around small radius curves and in right-hand and left-hand turns without releasing or respacing the carrier members.

3 Claims, 6 Drawing Figures

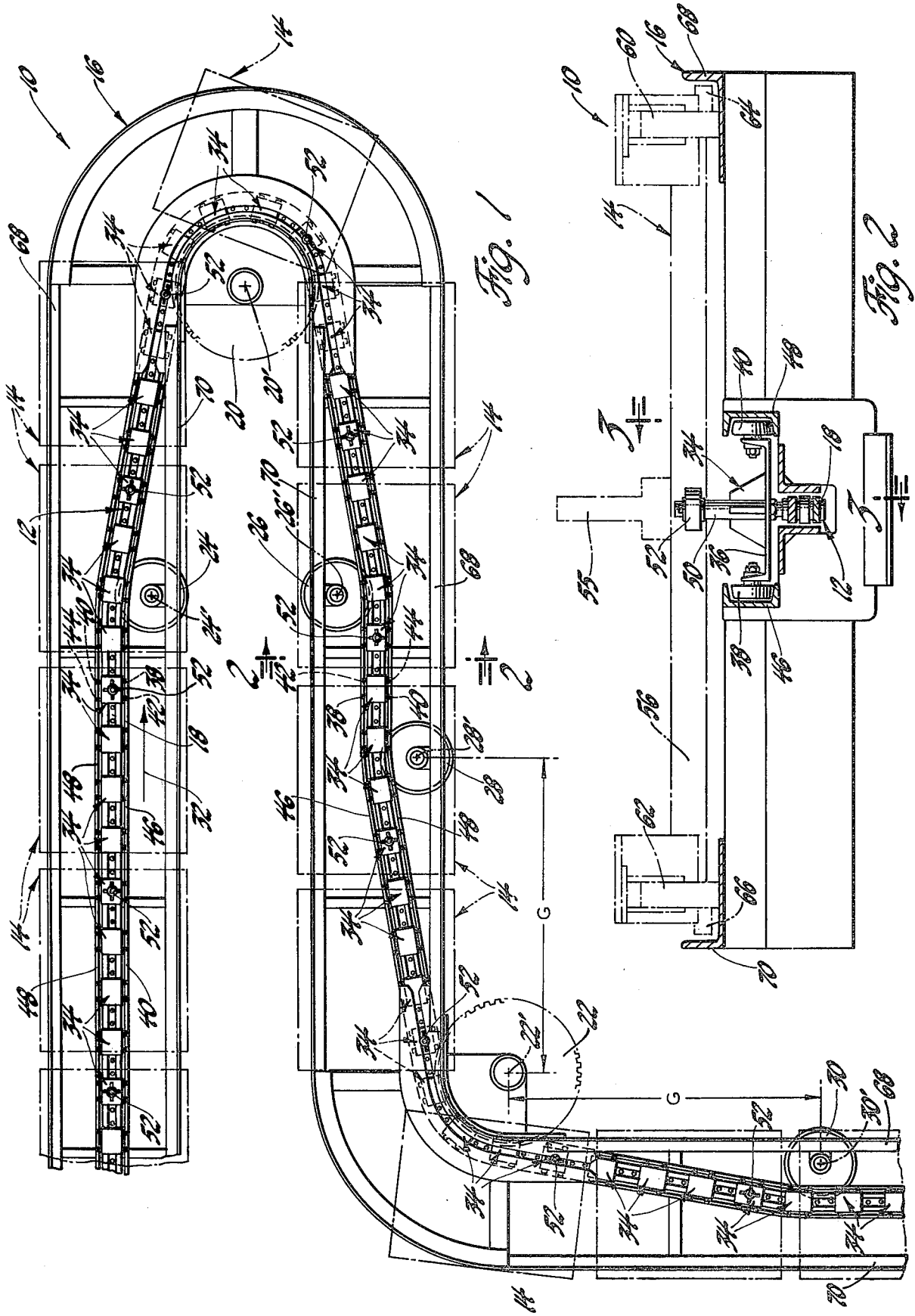

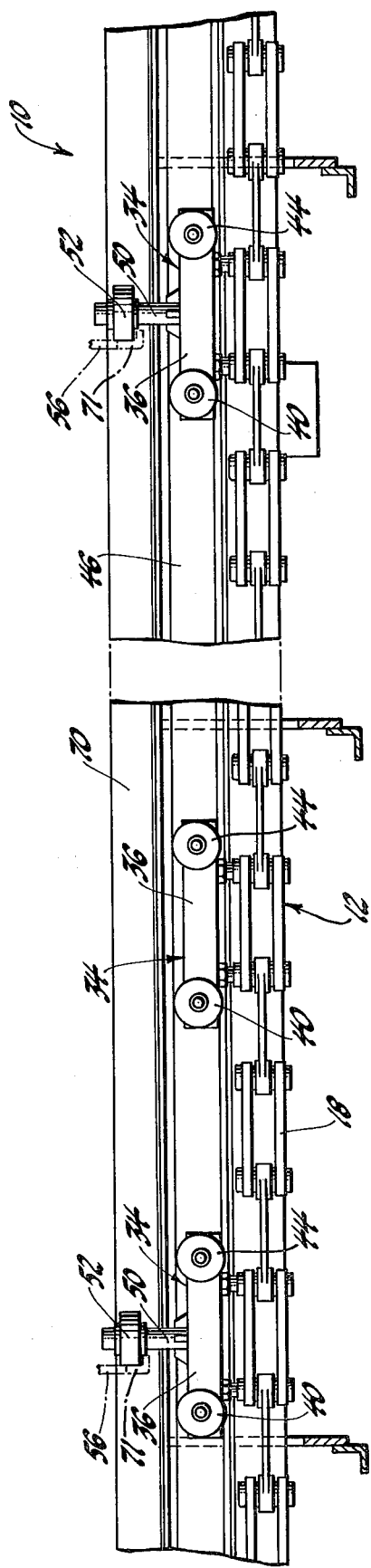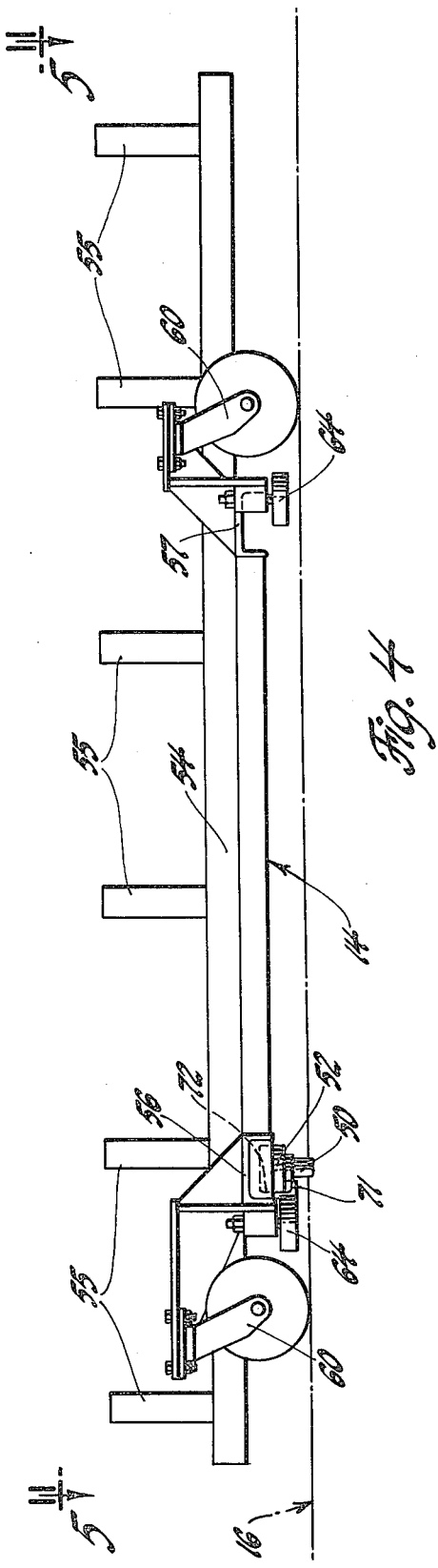

CLOSE-PACK CONVEYOR SYSTEM

This invention relates to conveyors and more particularly concerns a conveyor system that allows load carriers to make right-hand and left-hand turns while maintaining close spacing between the load carriers.

More specifically, the conveyor system according to the present invention includes and endless drive chain having a plurality of tow pins which serve to move a plurality of closely spaced load carrier members along a guide rail assembly. The guide rail assembly controls the direction of movement of the carrier members and permits the carrier members to move from a right-hand turn to a left-hand turn without sacrificing the ability to maintain the close spacing of the carrier members. This is accomplished by having each of the carrier members provided with a pusher bar which extends transversely to the longitudinal axis of the drive chain and includes a guide slot which extends from one side to the other of the carrier member. The guide slot receives one of the tow pins which applies drive to the carrier member through the pusher bar so that during travel of a carrier member along a straight path, the tow pin is located substantially midway between the opposite sides of the associated carrier member, but as the carrier member approaches a curved path whether to the left or to the right of the straight path, the tow pin moves laterally along the guide slot in the direction of the particular curved path and towards one side of the carrier member until the same enters the curved path at which time the tow pin is positioned at the inside of the curved path.

The objects of the present invention are to provide a new and improved conveyor system that maintains close spacing between load carrier members and permits the carrier members to make right-hand and left-hand turns while travelling along a guide rail assembly; to provide a new and improved conveyor system in which the relationship between the drive chain and the longitudinal center line of the carrier member connected to the drive chain is variable so as to allow the drive chain to move laterally in opposite directions with respect to the carrier member and thereby permit close spacing of the carrier members; to provide a new and improved conveyor system that is capable of moving closely spaced large carrier members around small radius curves and in right-hand and left-hand turns without releasing or respacing the carrier members; and to provide a new and improved conveyor system which virtually eliminates the open spaces between load carriers by having a drive chain for the carrier members that moves laterally relative to the carrier members from one side to the other side thereof while maintaining a driving connection therewith so as to allow the carrier member to change direction.

The above objects and others will be apparent from the following detailed description when taken with the drawings in which:

FIG. 1 is a plan view of a conveyor system made in accordance with the present invention that shows a plurality of carrier members in phantom line outline form for clarity purposes;

FIG. 2 is an enlarged sectional view taken on line 2—2 of FIG. 1 showing one of the trolley members of the drive chain assembly which drives the carrier members;

FIG. 3 is a side elevational view taken on line 3—3 of FIG. 2;

FIG. 4 is a side elevational view of one of the carrier members used in the conveyor system;

Figure 5:
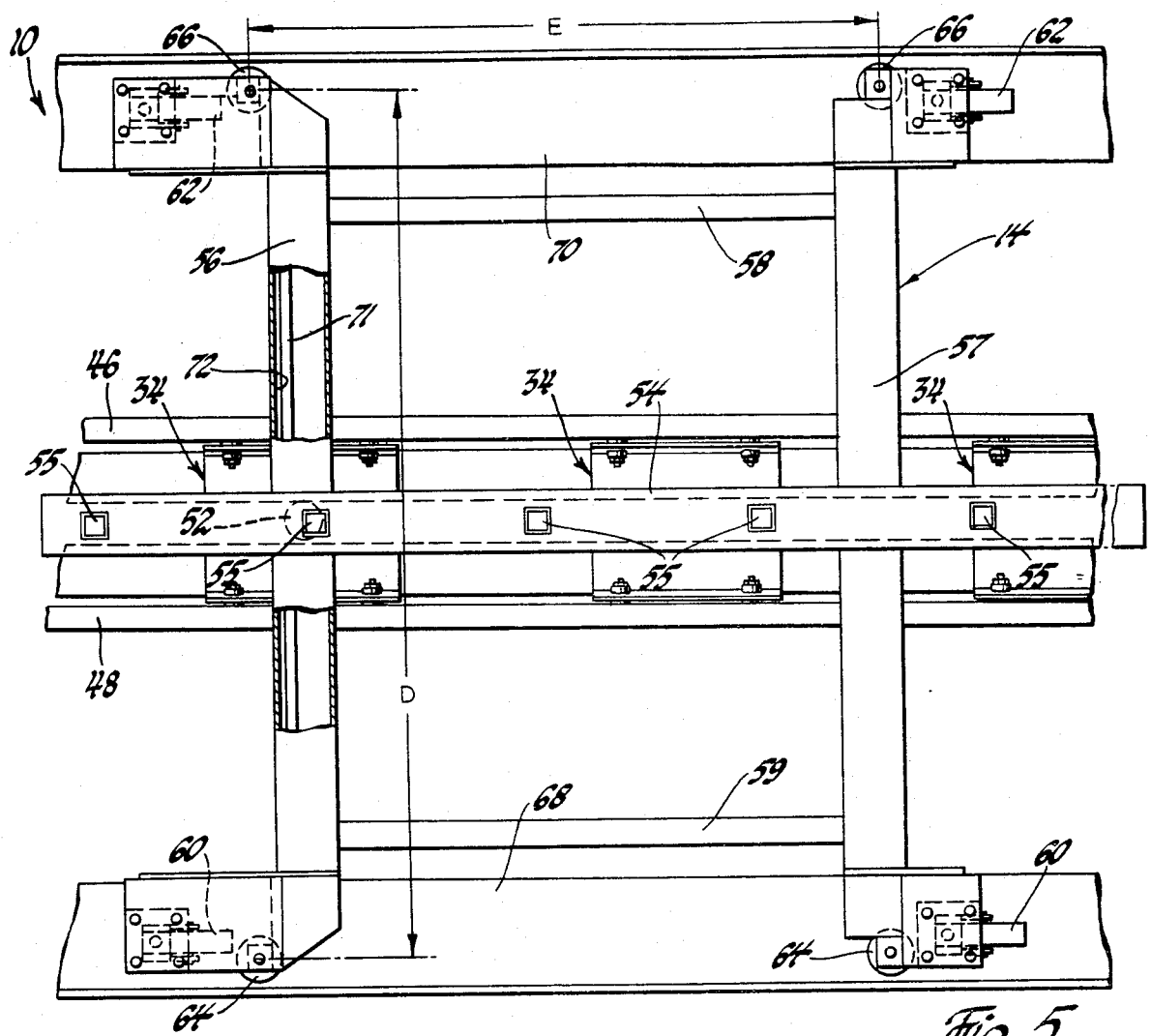
FIG. 5 is a plan view of the carrier member of FIG. 4 taken on line 5—5 thereof.

Referring to the drawings and more particularly to FIGS. 1, 2 and 3 thereof, a top view of a conveyor system 10 made in accordance with the present invention is shown which, in general, comprises a drive chain assembly 12, a plurality of identical carrier members 14, and a guide rail assembly 16 which serves to support and guide the carrier members 14 as they are driven by the drive chain assembly 12. The portion of the conveyor system 10 shown in FIG. 1 includes a 180° horizontal turn and a 90° horizontal turn, it being understood that similar turns (not shown) are part of the present conveyor system and provide a complete circuit for transporting the carrier members 14 from a load station to a work station and finally to an unload station.

More specifically, the drive chain assembly 12 seen in FIG. 1 includes an endless chain 18 entrained about large diameter wheels 20 and 22 with portions of the chain 18 engaging small diameter wheels 24, 26, 28, and 30. Each of the small diameter wheels 24–30 serves as an idler wheel while each of the large diameter wheels 20 and 22 take the form of a sprocket with one or more of the large diameter wheels 20 and 22 being connected through appropriate reduction gearing to an electric motor (not shown) which serves to drive the chain 18 in the direction of the arrow 32. As best seen in FIGS. 2 and 3 every fourth link of the chain 18 is rigidly bolted to a truck or trolley member 34 each of which includes a base frame 36 supporting two pair of laterally spaced wheels 38, 40 and 42, 44 that are adapted to travel within C-shaped channel members 46 and 48 which serve as a track for the trolley members 34. Also, as seen in FIGS. 1, 2, and 3, every fourth trolley member 34 rigidly supports an upstanding tow pin 50, the upper end of which is provided with a roller 52 adapted to be connected to one of the carrier members 14.

In this regard, it will be noted that, as seen in FIGS. 4 and 5, each of the carrier members 14 includes a longitudinally extending article support bar 54 provided with a plurality of upstanding pegs 55 which serve to support the articles to be conveyed. In addition, the support bar 54 is rigidly connected to a pair of longitudinally spaced cross bar members 56 and 57 which, in turn, are interconnected at their ends by parallel strut members 58 and 59. The opposite ends of each of the cross bar members 56 and 57 support identical casters 60 and 62 and also identical rollers 64 and 66. The casters 60, 62 and the rollers 64, 66 of each carrier member 14 are adapted to travel in laterally spaced guide rail members 68 and 70 which are part of the guide rail assembly 16. As seen in FIG. 2, each guide rail member 68 and 70 is L-shaped in cross section and serves to control the path movement of each of the carrier members 14. Thus, as seen in FIG. 1, the guide rail members 68 and 70 provide a straight path for the carrier members 14 to the left and to the right of the wheels 24, 26, and 28, and provide curved paths around the wheels 20 and 22. The curved path around wheel 20 provided by the guide rail members 68 and 70 has its center at the center of rotation 20' of the wheel 20 while the curved path around the wheel 22 has its center at the center of rotation 22' of the wheel 22. When the guide rail member 68 and 70 make the 180° turn around the wheel 20, the guide rail member 70 is located adjacent to and above the periphery of the wheel 20, and during the 90° turn around wheel 22, the guide rail member 68 is located adjacent to and above the periphery of the wheel 22.

Figure 6:
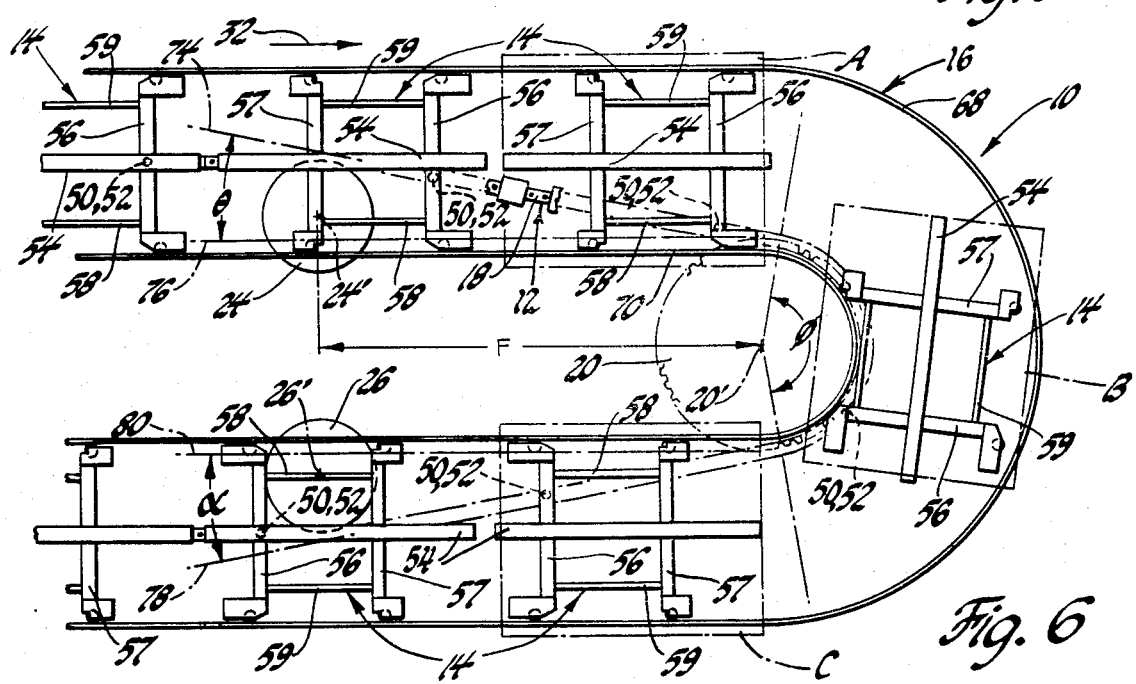
FIG. 6 is a plan view of a portion of the conveyor system having the trolley members of the drive chain assembly removed so as to more clearly show the connection between the carrier members and the drive chain.

The cross bar member 56 is formed from a channel member which, as seen in FIG. 4, is C-shaped in cross section with the open end facing downwardly. A pusher bar 71 is rigidly attached to the cross bar 56 and together therewith defines an elongated transversely extending horizontal slot 72 which extends from one end of the cross bar 56 to the other and receives the roller 52 connected to one of the tow pins 50 carried by a trolley member 34. Thus, as seen in FIG. 6, each of the tow pins 50 is located in the slot 72 formed in the cross bar 56 of one of the carrier members 14.

The conveyor system 10 described above and shown in FIGS. 1 through 6 serves to maintain close spacing of the carrier members 14 while permitting each to make right-hand and left-hand turns. In this regard and as seen in FIGS. 1 and 6, it will be noted that while the trolley members 34 are in the straight section of the guide rail assembly 16 that is located to the left of wheel 24, each trolley member 34 and the chain 18 connected thereto is located midway between the guide rail members 68 and 70. However, when the trolley members 34 and the chain 18 approach a right-hand turn such as the 180° horizontal turn provided by the wheel 20, at a point just after the chain 18 loses contact with the wheel 24, the chain 18 and the trolley members 34 move gradually laterally towards the guide rail 70 and then wind around the wheel 20 to make the 180° turn. During this time and as seen in FIG. 6, when the carrier members 14 are located on the guide rail members 68 and 70 to the left of the wheel 24, the roller 52 is located midway between the opposite side of the associated carrier member 14. As the carrier members 14 are being moved by the chain 18 in the direction of the arrow 32 towards the 180° horizontal turn and after the roller 52 travels to the right of the center of the rotation 24' of the wheel 24, the roller 52 begins moving laterally within the slot 72 of the cross bar 56 towards the guide rail member 70 while continuing to apply a driving force to the pusher bar 71. As a result, each of the carrier members 14 follows the path prescribed by the guide rail members 68 and 70 which, in this case, continues to be a straight path in alignment with the path provided by the guide rail members 68, 70 to the left of wheel 24. However, once the carrier member 14 reaches the position indicated by the letter A, the guide rail assembly causes the carrier member 14 to follow the 180° curved path around the wheel 20 to the position indicated by the letter B, and then moves to the position indicated by the letter C, wherefrom the carrier member 14 once again moves along a straight path until it reaches the 90° horizontal turn seen in FIG. 1. After the chain 18 leaves the wheel 20, it again causes the roller 52 to move laterally within the guide slot 72 of the cross bar 56 while applying a driving force to the pusher bar 71. In this instance, the roller 52 moves gradually towards the guide rail member 68 until it reaches the wheel 26 at which point the chain 18 and, accordingly, the roller 52 again are located midway between the opposite sides of the carrier member 14 and midway between the guide rail members 68 and 70. The roller 52 maintains the midway position until it reaches the wheel 28 (FIG. 1) and moves to the left of the center of rotation 28' of the wheel 28 at which point the chain 18 and the rollers 52 again move from the midway position between the guide rails 68 and 70 towards the guide rail member 68 and then into peripheral contact with the wheel 22 so as to permit the carrier members 14 to negotiate the left-hand 90° horizontal turn. After the chain 18 loses contact with the wheel 22, it once again moves towards the guide rail member 70 until it reaches the midway position when contact is made with the wheel 30. The chain 18 then maintains the midway position until it approaches another turn.

A conveyor system 10, such as described above, has been successfully tested using carrier members 14 each of which was provided with an article support bar 54 (seen in FIG. 5) having a longitudinal length of 81 inches. The center to center distance between rollers 64 and 66 indicated by the letter D was 56 inches and the center to center distance between rollers 66, 66 or rollers 64, 64 along each side of the carrier member 14 and indicated by the letter E was 42 inches. As seen in FIG. 1, the diameter of each of the wheels 20 and 22 was 6.0 feet, and the diameter of each of the wheels 24, 26, 28 and 30 was 3.0 feet. As seen in FIG. 6, the distance from the center 24' of the wheel 24 to the center 20' of the wheel 20 and indicated by the letter F was 11.3 feet; the distance between the centers 24' and 26' of the wheels 24 and 26 respectively was 7.0 feet; and the distance between the vertical center axes of adjacent tow pins 50 was 8.0 feet. As seen in FIG. 1 the distances between the center 22' of wheel 22 and the center 28' of wheel 28, and the distance between the center 30' of the wheel 30 and the center 22' of the wheel 22, each indicated by the letter G, was 11.3 feet. The trolley members 34 were driven by a link chain identified as Webb Rivetless Chain X678 manufactured by the Jervis B. Webb Company. Also, the angle $\theta$ (seen in FIG. 6), formed by a straight line 74 extending along the longitudinal center axis of the chain 18 and tangent to the wheel 24 and the wheel 20, and a straight line 76 tangent to the wheel 20 and parallel to each guide rail 68, 70, was 10°. The angle $\phi$, which is the angle of contact between the chain 18 and the periphery of the wheel 20, was 160°; and the angle $\alpha$ formed by a straight line 78 extending along the longitudinal axis of the chain 18 and tangent to the wheel 26 and the wheel 20, and a straight line 80 tangent to the wheel 20 and parallel to the guide rails 68, 70, was 10°. Similarly, as seen in FIG. 1, after the chain 18 lost contact with the wheel 28, it moved toward the wheel 22 at a 10° angle and the angle of peripheral contact of the chain 18 with the wheel 22 during the 90° turn was 70°, after which the chain 18 moved toward the wheel 30 at an angle of 10° and then again was located midway between the guide rails 68 and 70. Thus, in each instance, after the chain 18 lost contact with the wheels 24 and 28 while traveling in the direction of arrow 32, the chain 18 and the trolley members 34 moved laterally into the turn toward the wheels 20 and 22 at an angle of 10° relative to the adjacent straight sections of the guide rails 68 and 70. Similarly, when the chain 18 lost contact with the wheels 20 and 22, the chain 18 moved laterally out of the turn toward the wheels 26 and 30 at an angle of 10° relative to the adjacent straight sections of the guide rail members 68 and 70.

Although only one form of this invention has been shown and described, other forms will be readily apparent to those skilled in the art. Therefore, it is not intended to limit the scope of this invention by the embodiment selected for the purpose of this disclosure but only by the claims which follow.

The embodiments of the invention in which an exclusive property or privilege is claimed are defined as follows:

1. A conveyor system for maintaining close spacing between carrier members while said carrier members are conveyed along a straight path and a curved path, a guide rail assembly for providing said straight path and said curved path for said carrier members, a drive chain having a plurality of tow pins for moving said carriers along said guide rail assembly, each of said carrier members having a pusher bar extending transversely to said drive chain, said pusher bar having a guide slot formed therein along the longitudinal axis thereof for receiving one of said tow pins, and means for positioning said drive chain so that during travel of one of said carrier members along said straight path the tow pin associated therewith is located between the opposite sides of said one of said carrier members but as said one of said carrier members approaches said curved path said tow pin moves along said guide slot in the direction of said curved path toward one side of said one of said carrier members until said one of said carrier members enters said curved path at which time said tow pin is positioned substantially at said one side of said one of said carrier members on the inside of the turn.

2. A conveyor system for maintaining close spacing between carrier members while said carrier members are conveyed along a straight path after making a left-hand turn or a right-hand turn, a guide rail assembly providing said straight path and the right-hand and left-hand turns for said carrier members, a drive chain having a plurality of tow pins for moving said carrier members along said guide rail assembly, each of said carrier members having a pusher bar extending transversely to the longitudinal axis of said drive chain, said pusher bar having a guide slot formed therein that extends from one side of said each of said carrier members to the other side thereof for receiving one of said tow pins, and means for positioning said drive chain so when one of said carrier members makes said left-hand turn the tow pin associated therewith is located along said one side of said one of said carrier members and as said one of said carrier members approaches said right-hand turn said tow pin moves along said guide slot in the direction of said right-hand turn toward said other side of said one of said carrier members until said one of said carrier members enters said right-hand turn at which time said tow pin is positioned substantially at said other side of said one of said members on the inside of the turn.

3. A conveyor system for maintaining close spacing between carrier members while said carrier members are conveyed along a straight path and a curved path, a guide rail assembly for providing said straight path and said curved path for said carrier members, a drive chain assembly including a plurality of trolley members, a tow pin mounted on spaced trolley members for moving said carrier members along said guide rail assembly, each of said carrier members having a pusher bar extending transversely to said drive chain, said pusher bar having a guide slot located along the longitudinal axis of the pusher bar for receiving said tow pin, said guide slot extending from one side to the other side of said carrier member, and means for positioning said drive chain so that during travel of one of said carrier members along said straight path the tow pin associated therewith is located substantially midway between the opposite sides of said one of said carrier members but as said one of said carrier members approaches said curved path said tow pin moves along said guide slot in the direction of said curved path toward said one side of said one of said carrier members until said one of said carrier members enters said curved path at which time said tow pin is positioned substantially at said one side of said one of said carrier members on the inside of the turn.

* * * * *